(12) United States Patent
Walcher et al.

(10) Patent No.: US 12,703,031 B2
(45) Date of Patent: Aug. 11, 2026

(54) CUTTING TOOL FOR MACHINING FIBER COMPOSITE MATERIALS

(71) Applicant: Ceratizit Balzheim GmbH & Co. KG, Balzheim (DE)

(72) Inventors: Jochen Walcher, Balzheim (DE); Michael Schmid, Balzheim (DE); Peter Luibrand, Balzheim (DE); Oliver Rapp, Balzheim (DE)

(73) Assignee: Ceratizit Balzheim GmbH & Co. KG, Balzheim (DE)

( * ) Notice: Subject to any disclaimer, the term of this patent is extended or adjusted under 35 U.S.C. 154(b) by 594 days.

(21) Appl. No.: 18/255,902

(22) PCT Filed: Oct. 22, 2021

(86) PCT No.: PCT/EP2021/079317
§ 371 (c)(1),
(2) Date: Jun. 5, 2023

(87) PCT Pub. No.: WO2022/117257
PCT Pub. Date: Jun. 9, 2022

(65) Prior Publication Data

US 2024/0024970 A1 Jan. 25, 2024

(30) Foreign Application Priority Data

Dec. 3, 2020 (EP) .................................... 20211404

(51) Int. Cl.
*B23C 5/10* (2006.01)
*B23C 5/12* (2006.01)
*B23C 5/16* (2006.01)

(52) U.S. Cl.
CPC .................. *B23C 5/10* (2013.01); *B23C 5/12* (2013.01); *B23C 5/165* (2013.01);
(Continued)

(58) Field of Classification Search
CPC .. B23C 5/10; B23C 5/12; B23C 5/165; B23C 2210/483; B23C 2210/486;
(Continued)

(56) References Cited

U.S. PATENT DOCUMENTS 4,990,035 A * 2/1991 Scheuch .................. B23C 5/10
407/30
6,234,725 B1 5/2001 Campian
(Continued)

FOREIGN PATENT DOCUMENTS

CN 110191778 A 8/2019
EP 3530389 A1 8/2019
(Continued)

*Primary Examiner* — Jermie E Cozart
(74) *Attorney, Agent, or Firm* — Laurence A. Greenberg; Werner H. Stemer; Ralph E. Locher

(57) ABSTRACT

A cutting tool for machining fiber composite materials has clamping section and a cutting section which extend along a longitudinal axis. The cutting section has a basic cylindrical shape. First chipping flutes form left-hand spirals and second chipping flutes form right-hand spirals. Intersecting first and second chipping flutes form a plurality of discrete cutting elements on the cutting section. The cutting elements have a first circumferential cutting edge running along a left-hand spiral and a second circumferential cutting edge running along a right-hand spiral. The cutting edges run along a common enveloping cylinder surface that defines the outer circumference of the cutting section. The first and second circumferential cutting edges open into a common tip. Primary free surfaces adjoin the circumferential cutting edges in the circumferential direction and they adjoin one another along a first free surface edge.

14 Claims, 3 Drawing Sheets

(52) U.S. Cl.
CPC ................. *B23C 2210/0414* (2013.01); *B23C 2210/0492* (2013.01); *B23C 2210/123* (2013.01); *B23C 2210/20* (2013.01); *B23C 2210/402* (2013.01); *B23C 2210/445* (2013.01); *B23C 2210/483* (2013.01); *B23C 2210/486* (2013.01); *B23C 2226/27* (2013.01)

(58) Field of Classification Search
CPC ........ B23C 2226/27; B23C 2210/0414; B23C 2210/0492; B23C 2210/123; B23C 2210/20; B23C 2210/402; B23C 2210/445
See application file for complete search history.

(56) References Cited

U.S. PATENT DOCUMENTS

| | | | | |
|---|---|---|---|---|
| 7,090,442 | B2 * | 8/2006 | Ahrnkiel | B23C 5/10 407/55 |
| 9,174,287 | B2 * | 11/2015 | Shpigelman | B23C 5/10 |
| 10,272,504 | B2 * | 4/2019 | Dodds | B23P 15/34 |
| 11,014,173 | B2 | 5/2021 | Huijs et al. | |
| 2005/0123363 | A1 | 6/2005 | Ahrnkiel et al. | |

FOREIGN PATENT DOCUMENTS

| | | | |
|---|---|---|---|
| JP | H06246525 | A | 9/1994 |
| JP | 2015205360 | A | 11/2015 |
| WO | 2014058693 | A1 | 4/2014 |
| WO | 2016098092 | A1 | 6/2016 |
| WO | 2017134011 | A1 | 8/2017 |
| WO | 2020164887 | A1 | 8/2020 |

* cited by examiner b1 b2 RSF 6 RR δ1 δ2 10 δ3 RS rZM b4 b3 5 γ1 LR γ2 9 γ3 LS

A - A

B - B

CUTTING TOOL FOR MACHINING FIBER COMPOSITE MATERIALS

FIELD AND BACKGROUND OF THE INVENTION

The present invention relates to a milling tool for machining fiber composite materials.

When machining fiber composite materials, such as in particular carbon fiber-reinforced plastics (CFRP), aramid fiber-reinforced plastics (AFRP), glass fiber-reinforced plastics (GFRP) and polyester fiber-reinforced plastics, milling tools are used that are often made in one piece or monolithically from a cutting material, such as in particular hard metal (cemented carbide), cermet or a cutting ceramic and can also be provided with a PVD (physical vapor deposition) or CVD (chemical vapor deposition) hard material coating.

An important requirement in the machining of fiber composite materials is the avoidance of delamination and fiber protrusion. Delamination is understood to be a separation of layers of the fiber composite. Tensile stresses introduced during machining can cause delamination. In the case of fiber protrusion, fiber residues protrude from the cut edge.

In order to avoid delamination, approaches are known to form pulling and pressing cutting edges on the tool and to position the tool relative to a workpiece during machining in such a manner that the workpiece is compressed. For this purpose, it is necessary that the center of the workpiece lies between the pulling and pressing cutting edges.

Such a tool, also called a compression cutter, is shown for example in JPH06246525.

EP3530389 (A1) of the applicant shows a milling tool having discrete cutting elements, wherein a cutting edge area is formed with a pressing cut and a cutting edge area with a pulling cut. There is a transition area between the pressing and pulling cutting edge areas.

The disadvantage of previously known milling tools having a pulling and a pressing cutting edge area is that care must be taken to position the tool axially with respect to the workpiece in order to introduce the pulling and pressing forces symmetrically around a workpiece center. Furthermore, the length of the cutting edge area of the tool must be matched to the thickness of the workpiece.

SUMMARY OF THE INVENTION

The object of the present invention is to provide an improved milling tool for machining fiber composite materials.

In particular, the tool is to be universally applicable for various milling operations and with respect to workpiece thicknesses.

The object is achieved by a milling tool having the features as claimed. Preferred embodiments are disclosed in the dependent claims.

By virtue of the fact that the milling tool comprises:

- a clamping section and a cutting edge section which extend along a longitudinal axis,
  - wherein the cutting edge section has a basic cylindrical shape,
  - wherein a plurality of first chip flutes that are formed as left-facing spirals and a plurality of second chip flutes that are formed as right-facing spirals are formed on the cutting edge section and a plurality of discrete cutting elements is formed on the cutting edge section by way of the intersecting first chip flutes and second chip flutes,
- wherein cutting elements comprise a first circumferential cutting edge running along a left-facing spiral and a second circumferential cutting edge running along a right-facing spiral, each of which extends along a common enveloping cylindrical surface which defines an outer circumference of the cutting edge section, and said first circumferential cutting edge and second circumferential cutting edge terminate in a common tip,
- wherein at least at a partial quantity of the plurality of cutting elements a first primary clearance surface which extends at a first primary clearance angle adjoins the first circumferential cutting edge in the circumferential direction and a second primary clearance surface which extends at a second primary clearance angle adjoins the second circumferential cutting edge in the circumferential direction, wherein the first primary clearance surface and the second primary clearance surface adjoin each other along a first clearance surface edge,
- delamination and/or fiber protrusion can be prevented to the greatest extent possible. A milling tool with a large total cutting edge length and favorable cutting properties is achieved.

In a clockwise-rotating operation, those cutting edges which are formed on cutting elements along left-facing spiral flutes and face in the direction of the tool tip have a “pressing” effect, in other words exert an axial force component in the direction of the workpiece. In contrast, a cutting edge that runs along a right-facing flute acts with a pulling cut, in other words the circumferential cutting edge in question exerts an axial force component on a workpiece to be machined in the direction of the clamping section, in other words in the direction of the shank of the milling tool.

Since the cutting elements comprise both a pulling and a pressing cutting edge, the milling tool has essentially neutral cutting properties regardless of an axial position, in the sense that the same conditions prevail along the cutting edge area essentially at all axial positions with respect to an axial cutting force component. Thus, an axial positioning of the milling tool relative to a workpiece is not decisive.

Rather, the tool acts “neutrally”, since no areas with preferred axial force application (in other words predominantly pressing or predominantly pulling action) are formed.

It is not necessary to pay attention to the axial positioning of the milling tool relative to a workpiece, as is the case with previously known compression milling cutters. The milling tool according to the invention can thus be used over the entire length of the cutting edge area. It can also be used for different material thicknesses.

In the case of the milling tool according to the invention, the pulling and the pressing circumferential cutting edges lie on a common cylindrical surface, which determines an outer circumference of the cutting edge section.

The first circumferential cutting edge and second circumferential cutting edge terminate in a common tip. Behind the cutting edge, clearance surfaces slope inwards. The milling tool according to the invention comprises a large total cutting edge length. The total cutting edge length means the sum of the cutting edges that are formed on one circumference of the milling tool. The large total cutting edge length with a high chip space volume increases the service life and performance of the milling tool. It is particularly advantageous that two circumferential cutting edges act on one cutting element.

It is preferably provided that the partial quantity of cutting elements amounts to at least 80%, in other words, at least 80% of the cutting elements have circumferential cutting edges with adjoining primary clearance surfaces, in other words at least 80% of the cutting elements are formed as claimed. It is further preferred that more than 90% of the cutting elements, especially preferred all cutting elements, are formed in this manner.

In general, for manufacturing reasons alone, all cutting elements are formed with circumferential cutting edges and clearance surfaces adjacent thereto. Nevertheless, the preferred development is intended to express the possibility that there may be individual cutting elements on which no or only partial circumferential cutting edges and/or clearance surfaces adjacent thereto are formed.

It is preferably provided that the primary clearance angles of the primary clearance surfaces are equal and are between 1° and 15°, measured to the tangential of the respective circumferential cutting edge. It is further preferred that the primary clearance angles are between 4° and 12°, particularly preferred around 8°±2°, especially 8°±1°.

The amounts for the primary clearance angle are deliberately chosen to be small in order to ensure a large angle of rake on the associated circumferential cutting edge and thus good adhesion of any hard material layer.

It is further preferred that the primary clearance surfaces are each adjoined by a secondary clearance surface.

It is preferably provided that the secondary clearance surfaces each extend at secondary clearance angles which are greater in amount than the primary clearance angles.

This indicates that the secondary clearance surfaces are preferably "steeper" than the primary clearance surfaces. This advantageously clears the primary clearance surfaces. It is particularly advantageous if the secondary clearance angles are at least 20% greater in amount, further preferred twice as large, up to at most four times as large as the primary clearance angles.

If, for example, the primary clearance angles are 8°, amounts of around 16° are particularly preferred for secondary clearance angles.

The secondary clearance surfaces are preferably followed by tertiary clearance surfaces, which run at even larger clearance angles, in other words even steeper. The clearance angles of the tertiary clearance surfaces are in particular ≥20°, further preferred ≥25°.

It is preferably provided that a width of the primary clearance surface is between 0.040 times and 0.110 times the tool diameter. In other words, this development means that the width of the primary clearance surface is preferably between 4% and 11% of the tool diameter.

It is quite preferably preferred that the width of the primary clearance surface is about 0.074 times the tool diameter. This specification includes values+/−10%, in other words a range of 0.067 to 0.081.

This development expresses the fact that the primary clearance surfaces are relatively narrow. The advantage of a narrow primary clearance surface is, among other things, that the clearance surface is easier to clear and allows a wide range of feed rates.

The secondary clearance surfaces are preferably of similar or equal width to the primary clearance surfaces.

It is possible to provide that the number of first chip flutes running along a left-facing spiral is different from the number of second chip flutes running along a right-facing spiral. In this manner, an advantageous division of the cutting edge section can be achieved. Furthermore, a favorable cutting edge overlap along a flight circle is achieved. By this is meant that due to the unequal number of chip flutes, the circumferential cutting edges are favorably distributed along the cutting edge section. Thus, the cutting edges are not arranged in alignment along a pitch circle, but offset from each other.

Particularly favorable combinations are, for example, four chip flutes running along a right-facing spiral with five or six chip flutes running along a left-facing spiral, or six chip flutes running along a right-facing spiral with eight chip flutes running along a left-facing spiral.

In other words, it is preferred that a ratio of the number of chip flutes running along a right-facing spiral to the number of chip flutes running along a left-facing spiral is 4:5 or 4:6 or 6:8. The absolute number of chip flutes also depends on the tool diameter. Thus, the combination of 4:5 is chosen for rather smaller diameters (for example Ø≤10 mm).

It is possible to provide that the spiral angle of the second chip flutes running along a right-facing spiral has a different amount than the spiral angle of the first chip flutes running along a left-facing spiral.

In particular, the spiral angle of the right-facing spiral is between 20° and 50°, in particular 30°±2°, further preferred 30°±1°.

It is preferred that the spiral angle of the left-facing spiral is between 20° and 50°, in particular 35°±2°, further preferred 35°±1°.

It is preferred that the amount of the spiral angle of the left-facing spiral is greater than that of the right-facing spiral.

A plurality of discrete cutting elements is formed on the cutting edge section by way of the intersecting first chip flutes along a left-facing spiral and second chip flutes along a right-facing spiral. The shape of the cutting elements in a development of the cutting edge section can essentially be addressed as that of a parallelogram. Two corners of the parallelogram face substantially in the longitudinal direction of the milling tool, and the other two corners face transversely thereto, in other words in a circumferential direction of the milling tool.

It is preferably provided that the shape of the top surface of the cutting elements, in other words the view in a development of the cutting edge section, has the shape of a parallelogram with two pairs of sides of unequal length.

In particular, the pressing circumferential cutting edges are longer than the pulling cutting edges. A length ratio can preferably be between 1.1 and 1.5, preferably close to 1.1.

It is particularly favorable if an internal angle of the parallelogram is between 40° and 90°, said internal angle belonging to longitudinally facing corners. This expresses that the cutting elements extend along the longitudinal direction of the milling tool.

Complementary to this, internal angles belonging to corners facing in the circumferential direction are blunt. Thus, more cutting edge length is advantageously offered in the circumferential direction.

In particular, the internal angle of the corners facing in the longitudinal direction is around 65°±15%, further preferred 65°±10%, still further preferred 65°±5%.

Internal angles of less than 65° tend to be unstable and sensitive.

It can preferably be provided that a circular grinding chamfer (also called a "round chamfer") is formed on circumferential cutting edges. A circular grinding chamfer means that a section that is formed by the cylindrical surface is adjacent to the respective circumferential cutting edge. In other words, according to this further development, the primary clearance surface does not start directly at the circumferential cutting edge, but indirectly after the circular grinding chamfer.

A circular grinding chamfer has a favorable effect on the smooth running of the milling tool. The milling tool is also supported advantageously with a circular grinding chamfer.

Also, the so-called cutting wedge—in other words the cross section of the cutting edge—is geometrically more favorable for the adhesion of a hard material layer, in particular a diamond coating, when a circular grinding chamfer is present.

The milling tool is preferably at least partially coated, in particular diamond-coated.

It is possible to provide that at least one of the chip flutes running along a right-facing spiral is formed deeper and/or wider than at least one of the chip flutes running along a left-facing spiral.

This expresses that the right-facing and left-facing chip flutes differ from each other with regard to a flute profile, in other words a cross-sectional shape of the chip flute.

The measure can be used to advantageously influence the pitch of the cutting edge section and the shape of the cutting elements.

For example, the depth of the chip flutes formed as right-facing spirals, in other words right-facing chip flutes, can be the same or different from a depth of the left-facing chip flutes. By depth is meant how far radially in the direction of the longitudinal axis the respective chip flute is formed into the basic cylindrical shape of the tool. A greater depth allows a more distinct design of a tooth profile of a cutting element. In addition, a volume of the chip flute is increased, which is favorable for a removal of chips.

Furthermore, it can be provided, for example, that the right-facing and left-facing chip differ with regard to their width. By width is meant the lateral extent of a chip flute between cutting elements.

The milling tool according to the invention is particularly suitable for trimming or milling pockets. It is advantageous that with the milling tool according to the invention no special axial positioning with respect to the workpiece has to be taken into account, since the milling tool operates uniformly along the entire cutting edge section.

Further advantages and usefulness of the invention are disclosed with the aid of the following description of exemplary embodiments with reference to the accompanying figures.

DETAILED DESCRIPTION OF THE INVENTION

Figure 1:
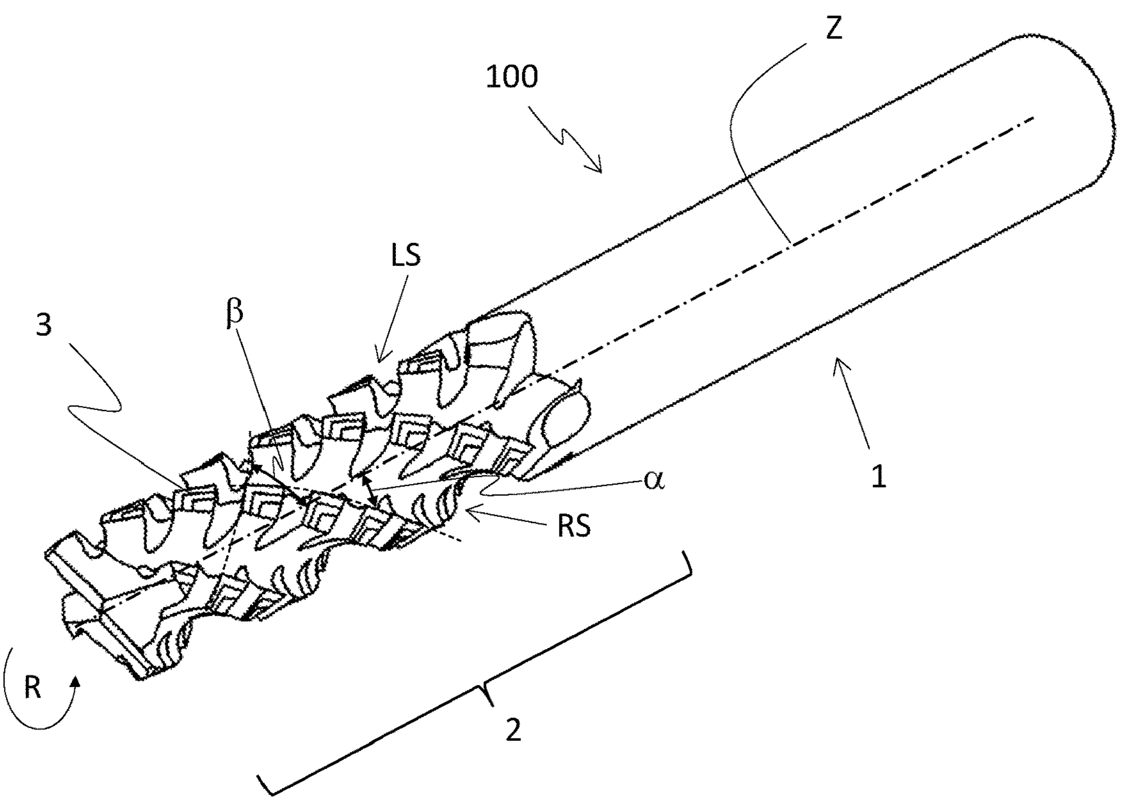
FIG. 1: shows a perspective view of a milling tool according to the invention.

FIG. 1 shows a milling tool 100 according to the invention in an embodiment. The milling tool 100 has a basic cylindrical shape and comprises a shank section 1, used to clamp the milling tool, and a cutting edge section 2 which extend along a longitudinal axis Z. The milling tool 100 discussed here is intended for clockwise-rotating use, as illustrated by the rotation arrow of the direction of rotation R. Of course, milling tools intended for anti-clockwise-rotating use are also encompassed by the invention.

In the exemplary embodiment, the clamping section 1 is realized as cylindrical. Deviating therefrom or supplementary thereto, other shapes such as flattenings, polygons or threads are also possible.

A plurality of first chip flutes LS in the form of left-facing spirals and a plurality of second chip flutes RS in the form of right-facing spirals are formed on the cutting edge section 2 and by way of said intersecting first chip flutes LS and second chip flutes RS a plurality of discrete cutting elements 3 is formed on the cutting edge section 2.

The first chip flutes LS which are formed as left-facing spirals (facing to the left) run at a spiral angle $\beta$ with respect to the longitudinal axis Z. The spiral angle $\beta$ of the left-facing spiral chip flutes LS typically has an amount between 20° and 50°, further preferred between 32° and 38°, in particular 35°±2°, further preferred 35°±1°.

The (right-facing) chip flutes RS, which are formed as right-facing spirals, run at a spiral angle $\alpha$ to the longitudinal axis Z.

In particular, the spiral angle $\alpha$ of the right-facing spiral is between 20° and 50°, especially 30°±2°, further preferred 30°±1°.

It is preferred that the amount of the spiral angle of the left-facing spiral is greater than that of the right-facing spiral.

In the present exemplary embodiment, the spiral angles are advantageously 35° for the spiral angle $\beta$ of the left-facing spirals and advantageously 30° for the spiral angle $\alpha$ of the right-facing spiral.

In the exemplary embodiment, there is an advantageous number of four chip flutes along the right-facing spiral and an advantageous number of five chip flutes along the left-facing spiral.

The spiral angle is determined between a tangent to the relevant chip flute and the longitudinal axis Z in a true-angle view.

According to convention, the spiral angle (also: angle of twist) of right-facing spiral chip flutes is given as positive.

A plurality of discrete cutting elements 3 are formed by way of the intersecting left-facing and right-facing chip flutes. The cutting elements 3 have—in geometrically simplified terms—the shape of truncated pyramids or studs and comprise a top surface that is square in a plan view. The shape of the top surface can, for example, be square or also have the shape of a parallelogram.

The shape is created by the spiral angle of the chip flutes and the respective chip flute profile.

In particular, the cutting elements 3, or more precisely their top surfaces, have the shape of a parallelogram in a plan view. In particular, the shape extends along the longitudinal axis Z.

Side flanks are formed on the cutting elements 3. Viewed in cross section, the shape of the side flanks in general corresponds to the shape of the respective chip flute. What is meant by this is that when the respective chip flute is introduced—which is typically done by grinding with a grinding wheel—the contour thus introduced is present on the side flanks of the cutting elements 3. In general, the side flanks therefore have a curved course and a smooth transition to a base of the respective chip flute. This is favorable from a mechanical point of view.

For a clockwise-rotating use, as shown in the discussed exemplary embodiment, the right-facing chip flutes RS can be deeper and/or wider than the left-facing chip flutes LS. However, the right-facing chip flutes RS and left-facing chip flutes LS are both important for chip evacuation.

It is possible to provide that the spiral angle $\alpha$ of the second chip flutes RS running along a right-facing spiral has a different amount than the spiral angle $\beta$ of the first chip flutes LS running along a left-facing spiral.

The milling tool 100 is in particular formed as a shank cutter. The clamping section 1 and the cutting edge section 2 are formed in one piece, in other words monolithically from a hard material, which can be, for example, a hard metal (cemented carbide), a cermet or a cutting ceramic. In particular, the milling tool 100 is preferably made entirely of hard metal, and is thus to be referred to as a so-called solid hard metal tool.

By hard metal is meant a composite material consisting predominantly of hard material particles which are surrounded and held by a ductile metallic binder. Most commonly, hard metal is one in which the hard material particles are formed at least predominantly of tungsten carbide and the metallic binder is a cobalt-based alloy or a nickel-based alloy.

In particular, the milling tool 100 is coated, preferably diamond coated.

Typically and preferably, the geometry of the cutting edge section 2 is produced by grinding a cylindrical hard metal rod (a blank).

Figure 2:
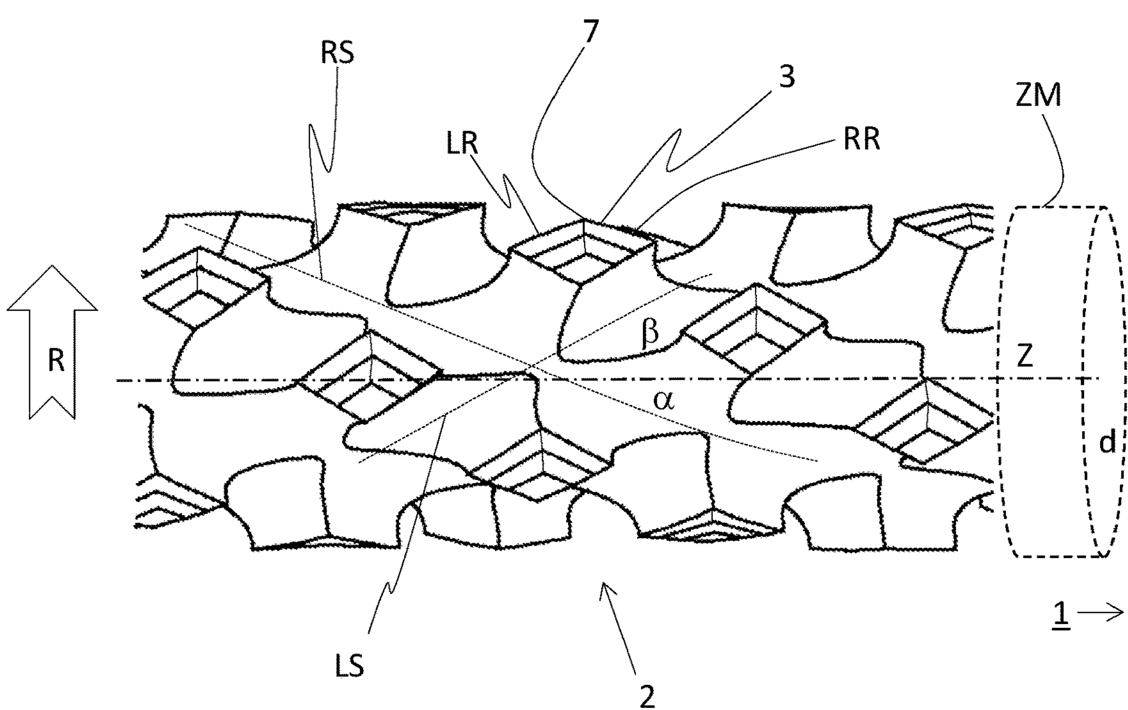
FIG. 2: shows a detail of the milling tool.

FIG. 2 shows a section of the cutting edge area section 2 of a milling tool 100 according to the invention, again with the intended direction of rotation R indicated.

A cutting element 3 has a first circumferential cutting edge LR running along a left-facing chip flute LS and a second circumferential cutting edge RR running along a right-facing flute RS.

When engaging a workpiece during use in the intended direction of rotation R, the first circumferential cutting edge LR running along a left-facing spiral performs a pressing cut. "Pressing cut" means that the respective circumferential cutting edge LR exerts an axial force component on a workpiece to be machined in the direction of a face (tip) of the milling tool 100. "Axial" in this context means as facing parallel to the longitudinal axis Z.

In contrast, a circumferential cutting edge RR running along a right-facing chip flute RS acts with a pulling cut, which means that the circumferential cutting edge RS in question exerts an axial force component on a workpiece to be machined in the direction of the clamping section 1, in other words in the direction of the shank of the milling tool 100.

By forming both a circumferential cutting edge with a pulling cut and also a circumferential cutting edge with a pressing cut on a cutting element 3, the cutting element 3 has a neutral effect with regard to exerting an axial force on a workpiece. A workpiece is thus subjected to neither compressive nor tensile stress, which effectively prevents delamination.

It is preferred that all cutting elements 3 in the cutting edge area 2 are formed in this manner. Only in an end region and in a run-out region in the direction of the clamping section 1 are cutting elements 3 of a different design typically present.

It is preferred that the first circumferential cutting edges LR running along a left-facing spiral and the second circumferential cutting edges RR running along a right-facing spiral are of unequal length.

Overall, the plough-shaped arrangement of the circumferential cutting edges produces a particularly clean cut. Fibers of a fiber composite material are cleanly sheared and cut through by the design according to the invention. The low fiber protrusion after machining with a milling tool according to the invention is particularly advantageous.

Also indicated in FIG. 2 is a cylindrical surface ZM, which determines an outer circumference of the cutting edge section 2 and the tool diameter—d. Both the first circumferential cutting edge LR and the second circumferential cutting edge RR extend along the common enveloping cylindrical surface ZM. In other words, the circumferential cutting edges LR, RR lie on an outer circumference of the milling tool 100.

Since the circumferential cutting edges extend along the common enveloping cylindrical surface ZM, the cutting conditions at the circumferential cutting edges are more favorable and smoother than, for example, with straight cutting edges. Furthermore, a large cutting edge length is available.

The first circumferential cutting edge LR and the second circumferential cutting edge RR terminate in a common tip 7.

FIG. 2 also illustrates the course of the chip flutes. The first chip flutes LS, which run along a left-facing spiral, run at a spiral angle $\beta$ to the longitudinal axis Z.

The second chip flutes RS running along a right-facing spiral run at a spiral angle $\alpha$ to the longitudinal axis Z.

It can be seen from the contours of the chip flutes of the exemplary embodiment in FIG. 2 that the left-facing first chip flutes LS are formed to a lesser depth than the right-facing chip flutes RS.

This can be the case in a clockwise-rotating operation according to the exemplary embodiment. In this manner, more chip space is available, which has a chip-removing effect in the direction of the shank section 1.

It is preferred that the left-facing and right-facing chip flutes are of the same depth, because a chip flute that is too shallow represents a limitation in terms of chip removal.

The amounts of the spiral angles of the left-facing first chip flutes LS and the right-facing second chip flutes RS can be the same or different. It is preferred that the spiral angles are different.

Figures 3, 4A, 4B:
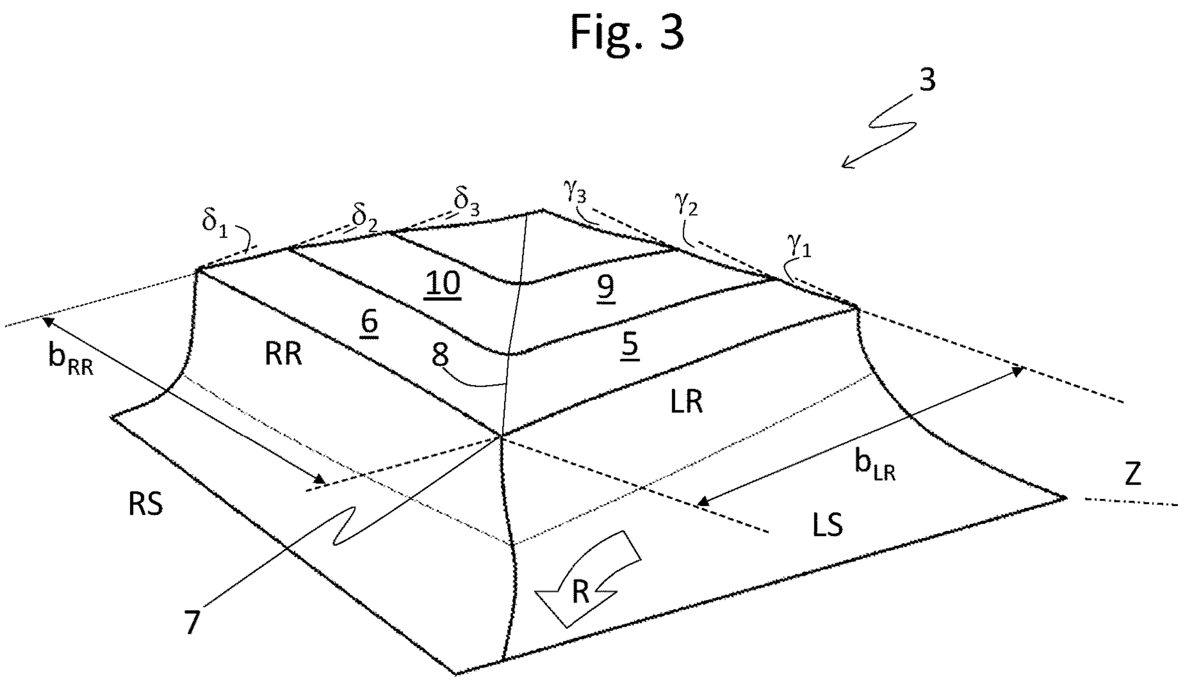
FIG. 3: shows a single cutting element.
FIGS. 4*a* and 4*b* show schematic sections through a cutting element.

FIG. 3 schematically shows a single cutting element 3 in detail. The direction of observation is opposite to the direction of rotation R. The first circumferential cutting edge LR and the second circumferential cutting edge RR terminate in a common tip 7.

A first primary clearance surface 5 is formed on the first circumferential cutting edge LR, and a second primary clearance surface 6 is formed on the second circumferential cutting edge, wherein the first primary clearance surface 5 and the second primary clearance surface 6 are adjacent to each other along a first clearance surface edge 8. The first primary clearance surface 5 runs at a first primary clearance angle $\gamma_1$.

The second primary clearance surface 6, which is associated with the second circumferential cutting edge RR, runs at a second primary clearance angle $\delta_1$.

It is preferred that the primary clearance angles $\gamma_1$, $\delta_1$ are equal.

As illustrated in the exemplary embodiment, it is preferably provided that further, secondary clearance surfaces adjoin the primary clearance surfaces. Thus, it is preferably provided that a first secondary clearance surface 9 adjoins the first primary clearance surface 5 and said secondary clearance surface 9 extends at a first secondary clearance angle $\gamma_2$.

Adjacent to the second primary clearance surface 6 is the second secondary clearance surface 10, which runs at a second secondary clearance angle $\delta_2$.

The amounts of the secondary clearance angles $\gamma_2$, $\delta_2$ are preferably greater than those of the primary clearance angles $\gamma_1$, $\delta_1$, in order to further clear the secondary clearance surfaces.

The cutting element 3 has a width $b_{LR}$ along the first circumferential cutting edge LR and said width corresponds to the length of the first circumferential cutting edge LR.

The cutting element 3 has a width $b_{RR}$ along the second peripheral cutting edge RR, which corresponds to the length of the second peripheral cutting edge RR.

It is preferred that the first peripheral cutting edge LR and the second peripheral cutting edge RR are of unequal length.

In particular, the width $b_{LR}$ of the peripheral cutting edge LR is greater than the width $b_{RR}$ of the peripheral cutting edge RR.

The relationships are even clearer from FIGS. 4*a* and 4*b*, which show schematic cross sections through a cutting element 3. The sections are arranged in such a manner that a section plane runs normal to the longitudinal axis Z. The angular amounts are overdrawn.

Optionally, a circular grinding chamfer RSF is formed on the first peripheral cutting edge LR and/or on the second peripheral cutting edge RR. This is illustrated as an example in FIG. 4*a*.

Circular grinding chamfer means that the chamfer adjacent to the respective circumferential cutting edge runs at least in sections along the tool diameter d, in other words on the enveloping cylinder surface ZM of the tool, as indicated by a radius $r_{ZM}$ of the cylinder surface ZM. A circular grinding chamfer RSF is, as already explained, favorable for smooth running and a robust cutting wedge as well as for a possible coating. A width of the circular grinding chamfer RSF is in particular between 0.01 mm and 0.20 mm, further preferred between 0.05 mm and 0.15 mm.

In general, the amounts of the primary clearance angles $\gamma_1$, $\delta_1$ are between 4° and 12°, particularly preferably around 8°±2°, especially 8°±1°.

The amounts of the secondary clearance angles $\gamma_2$, $\delta_2$ are chosen to be larger, typically between 10° and 30°, preferably around 16°±2°, further preferred around 16°±1°.

Furthermore, the primary clearance surfaces 5, 6 and the secondary clearance surfaces 9, 10 each have a width and the width $b_1$ of the primary clearance surface 6 and the width $b_2$ of the secondary clearance surface 10 are illustrated in FIG. 4*a*.

FIG. 4*b* shows the widths $b_3$ and $b_4$ of the primary clearance surface 5 and the secondary clearance surface 9 respectively.

In general, the widths of the primary clearance surfaces 5, 6 are equal, and the widths of the secondary clearance surfaces 9, 10 are also equal.

The widths $b_1$, $b_3$ of the primary clearance surfaces are preferably relatively narrow. It is preferably provided that a width $b_1$, $b_3$ of the primary clearance surface is between 0.040 times and 0.110 times the tool diameter d. In other words, this development means that the width of a primary clearance surface $b_1$, $b_3$ is preferably between 4% and 11% of the tool diameter d.

It is quite particularly preferred that the width of the primary clearance surfaces $b_1$, $b_3$ is about 0.074 times the tool diameter d. This specification includes values ±10%, in other words a range from 0.067 to 0.081.

The secondary clearance surfaces 9, 10 are preferably adjoined by third clearance surfaces which run at tertiary clearance angles $\gamma_3$, $\delta_3$. The tertiary clearance angles $\gamma_3$, $\delta_3$ are preferably significantly larger than the secondary clearance angles. Clearance angles of the tertiary clearance surfaces are in particular ≥20°, further preferred ≥25°. The tertiary clearance surfaces are thus located on the back side of the cutting element 3 and finally adjoin the chip flutes.

Figure 5:
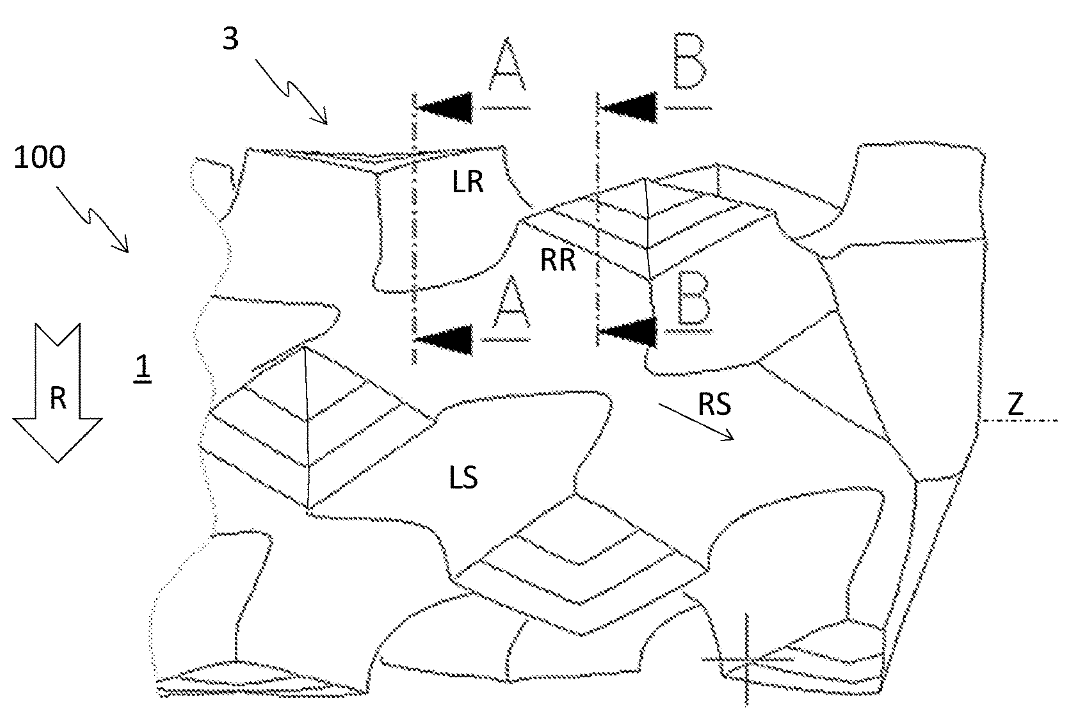
FIG. 5: shows a section of the milling tool with marked section planes

FIG. 5 shows a section of the cutting edge of a milling tool 100 according to the invention. The section planes A-A and B-B are shown and mark sections through cutting elements 3. The sections are each made in planes with the longitudinal direction Z as the normal vector, in other words as if the milling tool 100 were being sectioned normal to the longitudinal direction.

The section is oriented so that a sense of rotation in the direction of rotation R faces downwards in the illustration. A clamping section 1, in other words the shank, is indicated on the left in the illustration. The milling tool 100 is therefore illustrated rotating in a clockwise direction.

Figure 6A:
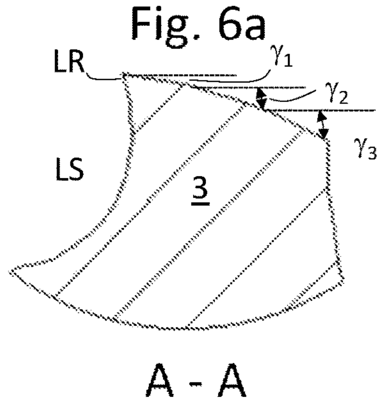
FIGS. 6*a* and 6*b* show cross sections to the sectional planes drawn in FIG. 5
Figure 6B:
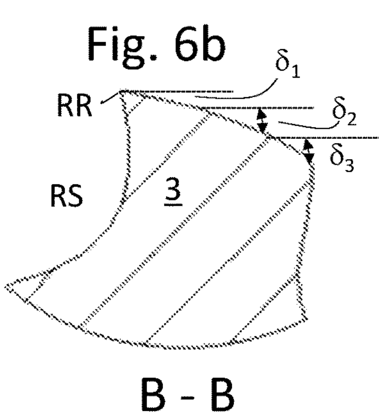

FIGS. 6*a* and 6*b* show sections A-A and B-B through cutting elements 3 according to FIG. 5.

FIG. 6*a* shows the section A-A. The primary clearance angle $\gamma_1$, the secondary clearance angle $\gamma_2$ and the tertiary clearance angle pare shown with the corresponding clearance surfaces, which adjoin the circumferential cutting edge LR, which runs along the chip flute LS with a left-facing spiral.

FIG. 6 *b* shows the section B-B. The primary, secondary and tertiary clearance angles $\delta_1$, $\delta_2$, $\delta_3$, are shown in the same manner, as are the clearance surfaces which adjoin the circumferential cutting edge RR which runs along the right-facing spiral flute RS.

Figure 7:
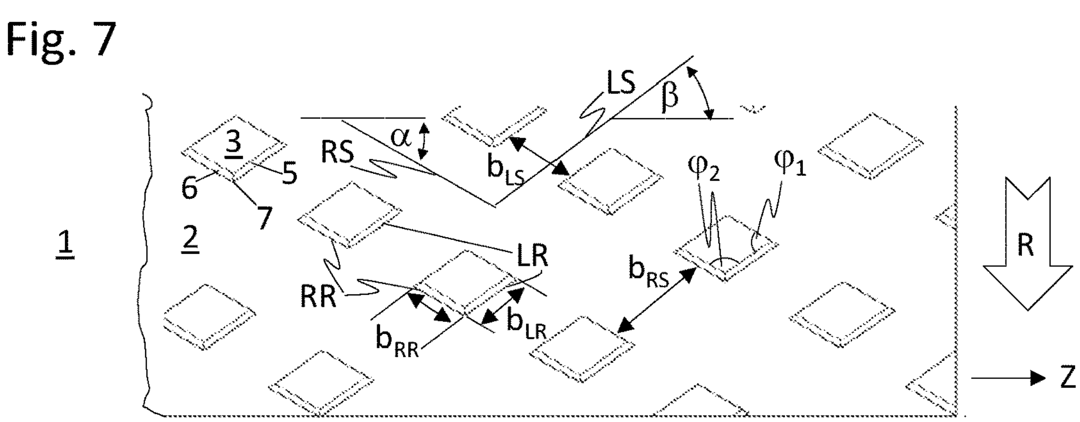
FIG. 7 shows a schematic and sectional view of the cutting edge area.

FIG. 7 schematically shows a section of a development of the cutting edge area 2 of a milling tool 100 according to the invention, wherein the intended direction of rotation R is again indicated. The basic shape of the cutting elements 3, or more precisely their top surfaces, can be seen in the development. The contour of the cutting elements 3 is formed by the first and second circumferential cutting edges RR, LR and—opposite each other—by the transition of the clearance surfaces on the back into the respective chip flute.

For the sake of clarity, only the primary clearance surfaces 5, 6 are shown on a cutting element 3. Also, not all reference signs are assigned to each cutting element 3.

The chip flute RS runs in a right-facing spiral at a spiral angle $\alpha$.

The chip flute LS runs in a left-facing spiral at a spiral angle $\beta$.

In the exemplary embodiment shown, the spiral angle $\alpha$ of the right-facing chip flute RS is preferably 30°, the spiral angle $\beta$ of the left-facing flute LS is preferably 35°.

A width $b_{LS}$ of the left-facing chip flute LS is smaller than a width $b_{RS}$ of the right-facing chip flute RS. In particular, the ratio of the widths of the chip flutes ($b_{RS}/b_{LS}$) is 1.2 to 3.0.

The respective widths of the chip flutes are considered to be the distances between the respective circumferential cutting edges and the opposite-lying transition of the clearance surface to the chip flute.

A first internal angle $\varphi_1$ of a cutting element 3 facing in the longitudinal direction Z of the milling tool 100 is preferably smaller than a second internal angle $\varphi_2$ of a cutting element 3 facing in the circumferential direction.

In particular, the first internal angle (pi is around 65°±15%, further preferred 65°±10%, still further preferred 65°±5%.

Internal angles of the longitudinal corners of less than 65° tend to be unstable and sensitive.

In a complementary manner thereto, the second internal angles $\varphi_2$ associated with corners facing in the circumferential direction are obtuse. It is apparent that the second internal angle, $\varphi_2$, is spanned by the adjacent circumferential cutting edges LR and RR. In this manner, more cutting edge length is advantageously offered in the circumferential direction.

In one variant, the first circumferential cutting edge LR and the second circumferential cutting edge RR are of unequal length. In particular, the width $b_{LR}$ of the peripheral cutting edge LR is greater than the width $b_{RR}$ of the peripheral cutting edge RR.

In particular, a length ratio of $(b_{LR}/b_{RR})$ is between 1.0 and 2.0, preferably between 1.1 and 1.5, particularly preferably around 1.1±0.1. This can be advantageous for a moderate predominance of a pressing effect.

The invention claimed is:

1. A milling tool for machining fiber composite materials, the milling tool comprising:

a clamping section and a cutting edge section extending along a longitudinal axis;

said cutting edge section having a basic cylindrical shape;

said cutting edge section having formed thereon a plurality of first chip flutes, formed as left-facing spirals, and a plurality of second chip flutes, formed as right-facing spirals, and wherein a plurality of discrete cutting elements are formed on said cutting edge section by way of intersecting said first and second chip flutes;

said cutting elements having a first circumferential cutting edge running along a left-facing spiral and a second circumferential cutting edge running along a right-facing spiral, each extending along a common enveloping cylindrical surface that defines an outer circumference of said cutting edge section, and wherein said first and second circumferential cutting edges terminate in a common tip;

at least a partial quantity of said plurality of cutting elements having a first primary clearance surface adjoining said first circumferential cutting edge in a circumferential direction and a second primary clearance surface adjoining said second circumferential cutting edge in the circumferential direction;

said first primary clearance surface extending at a first primary clearance angle and said second primary clearance surface extending at a second primary clearance angle, and said first and second primary clearance surfaces adjoining one another along a first clearance surface edge; and said primary clearance surfaces being adjoined by secondary clearance surfaces, said secondary clearance surfaces extending at secondary clearance angles, and said secondary clearance angles being greater in amount than said primary clearance angles.

2. The milling tool according to claim 1, wherein the partial quantity of the plurality of said cutting elements amounts to at least 80% of all of said cutting elements.

3. The milling tool according to claim 1, wherein said first and second primary clearance angles of said first and second primary clearance surfaces are equal and lie between 4° and 12°.

4. The milling tool according to claim 1, wherein a number of said first chip flutes running along the left-facing spiral is different from a number of said second chip flutes running along the right-facing spiral.

5. The milling tool according to claim 1, wherein a spiral angle of said second chip flutes running along the right-facing spiral is different in amount from the spiral angle of said first chip flutes running along the left-facing spiral.

6. The milling tool according to claim 1, wherein at least one of said chip flutes running along a right-facing spiral is formed deeper and/or wider than at least one of said chip flutes running along the left-facing spiral.

7. The milling tool according to claim 1, wherein a ratio between a number of said chip flutes running along the right-facing spiral and a number of said chip flutes running along the left-facing spiral is 4:5.

8. The milling tool according to claim 1, wherein a ratio between a number of said chip flutes running along the right-facing spiral and a number of said chip flutes running along the left-facing spiral is 4:6.

9. The milling tool according to claim 1, wherein a ratio between a number of said chip flutes running along the right-facing spiral and a number of said chip flutes running along the left-facing spiral is 6:8.

10. The milling tool according to claim 1, wherein said cutting section has a hard material coating, at least in part thereof.

11. A milling tool for machining fiber composite materials, the milling tool comprising:

a clamping section and a cutting edge section extending along a longitudinal axis;

said cutting edge section having a basic cylindrical shape;

said cutting edge section having formed thereon a plurality of first chip flutes, formed as left-facing spirals, and a plurality of second chip flutes, formed as right-facing spirals, and wherein a plurality of discrete cutting elements are formed on said cutting edge section by way of intersecting said first and second chip flutes;

said cutting elements having a first circumferential cutting edge running along a left-facing spiral and a second circumferential cutting edge running along a right-facing spiral, each extending along a common enveloping cylindrical surface that defines an outer circumference of said cutting edge section, and wherein said first and second circumferential cutting edges terminate in a common tip;

at least a partial quantity of said plurality of cutting elements having a first primary clearance surface adjoining said first circumferential cutting edge in a circumferential direction and a second primary clearance surface adjoining said second circumferential cutting edge in the circumferential direction;

said first primary clearance surface extending at a first primary clearance angle and said second primary clearance surface extending at a second primary clearance angle, and said first and second primary clearance surfaces adjoining one another along a first clearance surface edge; and a width of said primary clearance surfaces being between 0.040 times and 0.110 times a tool diameter of the milling tool.

12. A milling tool for machining fiber composite materials, the milling tool comprising:

a clamping section and a cutting edge section extending along a longitudinal axis;

said cutting edge section having a basic cylindrical shape;

said cutting edge section having formed thereon a plurality of first chip flutes, formed as left-facing spirals, and a plurality of second chip flutes, formed as right-facing spirals, and wherein a plurality of discrete cutting elements are formed on said cutting edge section by way of intersecting said first and second chip flutes;

said cutting elements having a first circumferential cutting edge running along a left-facing spiral and a second circumferential cutting edge running along a right-facing spiral, each extending along a common enveloping cylindrical surface that defines an outer circumference of said cutting edge section, and wherein said first and second circumferential cutting edges terminate in a common tip;

at least a partial quantity of said plurality of cutting elements having a first primary clearance surface adjoining said first circumferential cutting edge in a circumferential direction and a second primary clearance surface adjoining said second circumferential cutting edge in the circumferential direction;

said first primary clearance surface extending at a first primary clearance angle and said second primary clearance surface extending at a second primary clearance angle, and said first and second primary clearance surfaces adjoining one another along a first clearance surface edge; and a width of a first peripheral cutting edge being greater than a width of a second peripheral cutting edge and a ratio between the widths lies between 1.1 and 1.5.

13. A milling tool for machining fiber composite materials, the milling tool comprising:

a clamping section and a cutting edge section extending along a longitudinal axis;

said cutting edge section having a basic cylindrical shape;

said cutting edge section having formed thereon a plurality of first chip flutes, formed as left-facing spirals, and a plurality of second chip flutes, formed as right-facing spirals, and wherein a plurality of discrete cutting elements are formed on said cutting edge section by way of intersecting said first and second chip flutes;

said cutting elements having a first circumferential cutting edge running along a left-facing spiral and a second circumferential cutting edge running along a right-facing spiral, each extending along a common enveloping cylindrical surface that defines an outer circumference of said cutting edge section, and wherein said first and second circumferential cutting edges terminate in a common tip;

at least a partial quantity of said plurality of cutting elements having a first primary clearance surface adjoining said first circumferential cutting edge in a circumferential direction and a second primary clearance surface adjoining said second circumferential cutting edge in the circumferential direction;

said first primary clearance surface extending at a first primary clearance angle and said second primary clearance surface extending at a second primary clearance angle, and said first and second primary clearance surfaces adjoining one another along a first clearance surface edge; and a first internal angle of a cutting element facing in the longitudinal direction being smaller than a second internal angle of a cutting element facing in the circumferential direction.

14. A milling tool for machining fiber composite materials, the milling tool comprising:

a clamping section and a cutting edge section extending along a longitudinal axis;

said cutting edge section having a basic cylindrical shape;

said cutting edge section having formed thereon a plurality of first chip flutes, formed as left-facing spirals, and a plurality of second chip flutes, formed as right-facing spirals, and wherein a plurality of discrete cutting elements are formed on said cutting edge section by way of intersecting said first and second chip flutes;

said cutting elements having a first circumferential cutting edge running along a left-facing spiral and a second circumferential cutting edge running along a right-facing spiral, each extending along a common enveloping cylindrical surface that defines an outer circumference of said cutting edge section, and wherein said first and second circumferential cutting edges terminate in a common tip;

at least a partial quantity of said plurality of cutting elements having a first primary clearance surface adjoining said first circumferential cutting edge in a circumferential direction and a second primary clearance surface adjoining said second circumferential cutting edge in the circumferential direction;

said first primary clearance surface extending at a first primary clearance angle and said second primary clearance surface extending at a second primary clearance angle, and said first and second primary clearance surfaces adjoining one another along a first clearance surface edge; and a width of said left-facing first chip flutes being smaller than a width of said right-facing second chip flutes and a ratio between the widths of said chip flutes lies between 1.2 and 3.0.

* * * * *